E. Perry,
Wrench.
N° 70,605.   Patented Nov. 5, 1867.
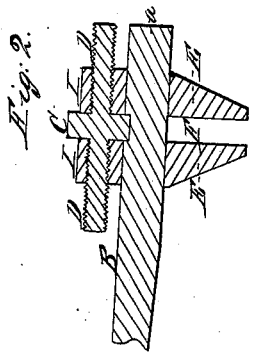
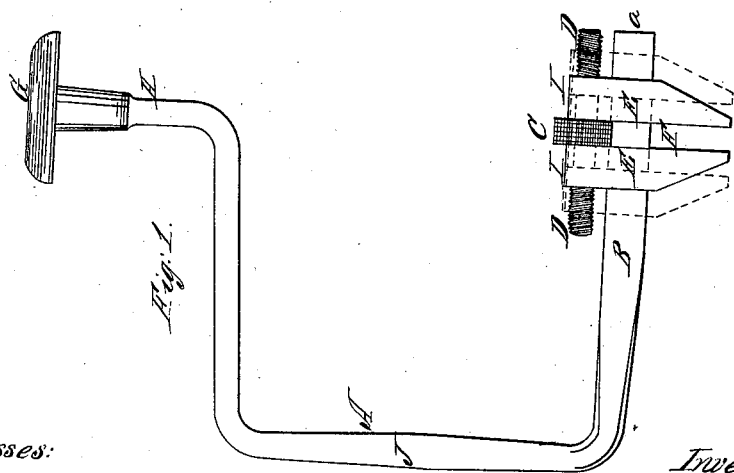
Witnesses:
Thos H. Dodge
D. L. Miller
Inventor:
Edward Perry

United States Patent Office.

EDWARD PERRY, OF HOPKINTON, MASSACHUSETTS.

Letters Patent No. 70,605, dated November 5, 1867.

---

IMPROVEMENT IN WRENCHES.

---

*The Schedule referred to in these Letters Patent and making part of the same.*

---

KNOW ALL MEN BY THESE PRESENTS:

That I, EDWARD PERRY, of Hopkinton, in the county of Middlesex, and Commonwealth of Massachusetts, have invented certain new and useful improvements in Wrenches for Carriages and other purposes; and I do hereby declare that the following is a full, clear, and exact description of the same, reference being had to the accompanying drawings, forming a part of this specification, in which—

Figure 1 represents a side view of my improved wrench, and

Figure 2 represents a longitudinal central section of a part of the bar and rosette screw, and the movable jaws.

To enable those skilled in the art to which my invention belongs to make and use the same, I will proceed to describe it more in detail.

In the drawings the part marked A is the handle of the wrench, which is made much in the form of a bit-stock. The part B is grooved out upon the inner side to receive the rosette C, from which project the screws D D, one having a right-hand and the other a left-hand thread, so that when they are turned by means of power applied to the rosette C, the movable jaws E E, upon the bar B, will be run or moved towards or from each other, as the case may be, while the centre of the opening F will always remain or be on a line with the centre of the cap-piece G, in which the upper end of the part H is swivelled. (See red lines, fig. 1.) As the screws D D fit and work in the heads I I of the jaws E E, as fully shown in fig. 2, the rosette C and jaws E E cannot become displaced so long as the screws D D remain in the jaws E E. The bar part B is made with square corners, to fit the corners of the slots or openings in the jaws E E. The jaws E E are broached out so as to slide on freely upon the end $a$ of the bar B. If preferred, a small screw or pin may be inserted in the bar B, to prevent the jaws from being run off of the ends of the screws D D.

The operation is as follows: The operator by means of the rosette C turns the screws D D, and thus adjusts the jaws at a proper distance apart. They are then placed upon the nut or bolt-head to be turned, and the operator, by pressing upon the cap-piece G, keeps the jaws in place, while with one hand applied to the bow part J, a rotary motion is imparted to the frame or handle A and jaws E, and by which operation the nut is screwed on or off, as the case may be.

For removing or screwing on nuts from the axles and other different parts of a carriage, my wrench is very convenient. It will also be found very convenient in all machine-shops and manufactories, as it will obviate the necessity of having a socket-wrench for different-sized nuts and bolt-heads. Again, the bar may be made with a shank for a handle, like a common hand-wrench, for which purpose it would answer very well. The jaws E E may be also made so that they will receive and hold the ends of bits, augers, or screw-drivers, or a separate socket-piece may be made to fit into the opening F, to receive the ends or shanks of the same.

Any skillful mechanic will be able to make the foregoing changes necessary for the enlarged use of my improved wrench.

Having described my improved wrench for carriages and other purposes, what I claim therein as new and of my invention, and desire to secure by Letters Patent, is—

The combination with the frame or stock A of the movable jaws E E, screws D D, and rosette C, substantially as and for the purposes set forth.

EDWARD PERRY.

Witnesses:
 THOS. H. DODGE,
 D. L. MILLER.